United States Patent
Oshima et al.

(10) Patent No.: US 6,765,065 B2
(45) Date of Patent: Jul. 20, 2004

(54) PROCESS FOR PRODUCING MODIFIED POLYMER RUBBER

(75) Inventors: Mayumi Oshima, Ichihara (JP); Seiichi Mabe, Ichihara (JP); Katsunari Inagaki, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 70 days.

(21) Appl. No.: 10/267,779

(22) Filed: Oct. 10, 2002

(65) Prior Publication Data

US 2003/0153692 A1 Aug. 14, 2003

(30) Foreign Application Priority Data

Jan. 9, 2002 (JP) ........................ 2002-002102
Feb. 8, 2002 (JP) ........................ 2002-032606

(51) Int. Cl.$^7$ .................. C08F 4/48; C08F 236/04
(52) U.S. Cl. ............... 525/272; 525/288; 525/291; 525/293; 525/301; 525/312; 525/375; 525/379; 526/173; 526/178; 526/180; 526/181
(58) Field of Search .................... 525/272, 288, 525/291, 293, 301, 312; 526/178, 180, 181

(56) References Cited

U.S. PATENT DOCUMENTS

| | | |
|---|---|---|
| 4,975,491 A | 12/1990 | Quirk |
| 5,077,346 A | 12/1991 | Dias et al. |
| 5,081,191 A | 1/1992 | Quirk |
| 5,171,800 A * | 12/1992 | Bronstert .................... 526/173 |
| 6,133,388 A * | 10/2000 | Lee et al. .................... 526/180 |

FOREIGN PATENT DOCUMENTS

| | | |
|---|---|---|
| EP | 0 334 042 A2 | 9/1989 |
| EP | 0 493 364 A2 | 7/1992 |
| EP | 0 794 224 A1 | 9/1997 |
| EP | 1 036 803 A2 | 9/2000 |
| JP | 60-72907 A | 4/1985 |
| JP | 7-196715 A | 8/1995 |
| JP | 2540901 B2 | 7/1996 |

\* cited by examiner

Primary Examiner—Fred Teskin
(74) Attorney, Agent, or Firm—Sughrue Mion, PLLC

(57) ABSTRACT

There is provided a process for producing a modified polymer rubber having modified both ends, which comprises the steps of:

(1) reacting a compound represented by the following formula (1) with an organic alkali metal compound to produce a chemical species,

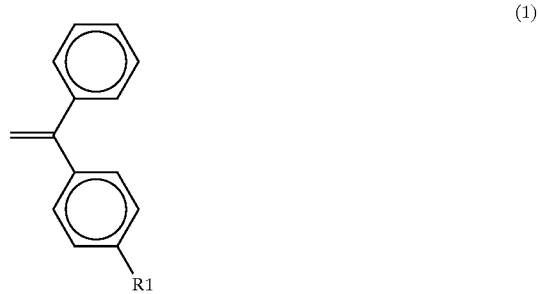

(1)

(2) polymerizing a conjugated diene monomer or a combination of a conjugated diene monomer with an aromatic vinyl monomer in the presence of the chemical species to produce an active polymer having an alkali metal at an end thereof, and (3) reacting the active polymer with a functional group-carrying modifying agent in a hydrocarbon solvent to produce the modified polymer rubber having modified both ends.

8 Claims, No Drawings

PROCESS FOR PRODUCING MODIFIED POLYMER RUBBER

FIELD OF THE INVENTION

The present invention relates to a process for producing a modified polymer rubber having superior impact resilience. The modified polymer rubber obtained according to said process is most suitable for motorcar tires having superior fuel cost saving.

BACKGROUND OF THE INVENTION

A styrene-butadiene copolymer obtained by emulsion polymerization is known as rubber used for motorcar tires. However, said copolymer has a problem that motorcar tires comprising said copolymer are not satisfactory from a viewpoint of fuel cost saving, because the copolymer does not have sufficient impact resilience.

In order to obtain rubber having superior impact resilience, JP-A60-72907 discloses a process, which comprises copolymerizing butadiene and styrene in a hydrocarbon solvent using an organolithium compound as an initiator, and a Lewis base such as ether as a microstructure controlling agent.

Further, Japanese Patent No. 2540901 proposes a process, which comprises reacting an alkali metal, which is bound at the end of a diene polymer rubber, with a specific acrylamide to obtain a modified diene polymer rubber having improved impact resilience.

Furthermore, Japanese Patent Application No. 2000-328813 discloses a process, which comprises reacting an alkali metal, which is bound at the end of a diene polymer rubber, with a specific amine to obtain a modified diene polymer rubber having improved impact resilience and processability.

However, recently, a level of a demand for fuel cost saving of motorcar tires is higher from an environmental view, and therefore, any of the above-mentioned copolymer rubbers can hardly meet such a demand.

SUMMARY OF THE INVENTION

An object of the present invention is to provide a process for producing a modified polymer rubber having superior impact resilience.

The present invention provides a process (the process being hereinafter referred to as "Process-1") for producing a process for producing a modified polymer rubber having modified both ends, which comprises the steps of:

(1) reacting a compound represented by the following formula (1) with an organic alkali metal compound, to produce a chemical species,

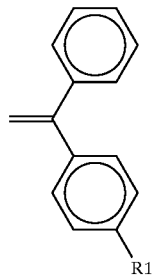

(1)

wherein $R_1$ is an amino, alkoxy, silyloxy, acetal; carboxyl or mercapto group or a group derived from any of these groups, (2) polymerizing a conjugated diene monomer or a combination of a conjugated diene monomer with an aromatic vinyl monomer in the presence of the chemical species to produce an active polymer having an alkali metal at an end thereof, and (3) reacting the active polymer with a functional group-carrying modifying agent in a hydrocarbon solvent to produce the modified polymer rubber having modified both ends.

The present invention also provides a process (the process being hereinafter referred to as "Process-2") for producing a modified polymer rubber having modified both ends, which comprises the steps of:

(1) reacting a compound represented by the above formula (1) with an organic alkali metal compound to produce a chemical species, (2) polymerizing a conjugated diene monomer or a combination of a conjugated diene monomer with an aromatic vinyl monomer in the presence of the chemical species to produce an active polymer having an alkali metal at an end thereof, (3) reacting the active polymer with a compound represented by the above formula (1) to produce an active polymer, each of whose both terminals is modified and has an alkali metal, and (4) reacting the active polymer with a functional group-carrying modifying agent in a hydrocarbon solvent to produce the modified polymer rubber having modified both ends.

DETAILED DESCRIPTION OF THE PREFERRED EMBODIMENT

Examples of a conjugated diene compound used in the present invention are 1,3-butadiene, isoprene, 1,3-pentadiene (piperylene), 2,3-dimethyl-1,3-butadiene and 1,3-hexadiene. Of these, 1,3-butadiene and isoprene are preferable from a viewpoint of availability and physical properties of a modified polymer rubber obtained.

Examples of an aromatic vinyl compound used in the present invention are styrene, α-methylstyrene, vinyltoluene, vinylnaphthalene, divinylbenzene, trivinylbenzene and divinylnaphthalene. Of these, styrene is preferable from a viewpoint of availability and physical properties of a modified polymer rubber obtained.

In the above formula (1), a preferable R, is an N,N-dimethylamino group, an N,N-diethylamino group, an N,N-dipropylamino group, an N,N-dibutylamino group or a morpholino group.

Examples of the compound represented by the formula (1) are 1-(4-N,N-dimethylaminophenyl)-1-phenylethylene, 1-(4-N,N-diethylaminophenyl)-1-phenylethylene, 1-(4-N,N-dipropylaminophenyl)-1-phenylethylene, 1-(4-N,N-dibutylaminophenyl)-1-phenylethylene and 1-(4-morpholinophenyl)-1-phenylethylene. Particularly, 1-(4-N,N-dimethylaminophenyl)-1-phenylethylene and 1-(4-morpholinophenyl)-1-phenylethylene are preferable from a viewpoint of remarkable improvement of fuel cost saving.

Although a compound having two polar groups can be also used as the compound represented by the formula (1) to attain the objects of the present invention, a compound having one polar group is industrially preferable from a viewpoint of solubility of said compound into a hydrocarbon solvent.

Examples of the organic alkali metal compound used in the present invention are hydrocarbon compounds containing a metal such as lithium, sodium, potassium, rubidium and cesium. Among them, preferable are lithium compounds or sodium compounds having 2 to 20 carbon atoms.

Specific examples thereof are ethyllithium, n-propyllithium, iso-propyllithium, n-butyllithium, sec-butyllithium, t-octyllithium, n-decyllithium, phenyllithium, 2-naphthyllithium, 2-butyl-phenyllithium, 4-phenyl-butyllithium, cyclohexyllithium, 4-cyclopentyllithium and 1,4-dilithio-butene-2. Among them, n-butyllithium or sec-butyllithium is preferable to obtain an active polymer having a narrow molecular weight distribution at a rapid reaction rate.

When a combination of a conjugated diene monomer with an aromatic vinyl monomer is used in the step (2) in the present invention, a weight ratio of conjugated diene compound/aromatic vinyl monomer is preferably from 50/50 to 90/10, and more preferably from 55/45 to 85/15. When the ratio is less than 50/50, the active polymer obtained may be insoluble in the hydrocarbon solvent, and as a result, it may be impossible to carry out a homogeneous polymerization. When the ratio exceeds 90/10, strength of the active polymer obtained may decrease.

A polymerization method in the step (2) is not particularly limited, and maybe a conventional one. In said step, it is permitted to use conventional solvents and additives usually used in the art such as hydrocarbon solvents; randomizers; and additives used for controlling a content of a vinyl bond (which bond is derived from the conjugated diene monomer) in the active polymer obtained.

As the above-mentioned additives used for controlling a content of a vinyl bond, Lewis basic compounds are exemplified. As said compounds, an ether or a tertiary amine is preferable from a viewpoint of industrial availability.

Examples of the above-mentioned ethers are cyclic ethers such as tetrahydrofuran, tetrahydropyran and 1,4-dioxane; aliphatic mono ethers such as diethyl ether and dibutyl ether; aliphatic diethers such as ethylene glycol dimethyl ether, ethylene glycol diethyl ether, ethylene glycol dibutyl ether, diethylene glycol diethyl ether and diethylene glycol dibutyl ether; and aromatic ethers such as diphenyl ether and anisole, Examples of the above-mentioned tertiary amines are triethylamine, tripropylamine, tributylanine, N,N,N',N'-tetramethylethylenediamine, N,N-diethylaniline, pyridine and quinoline.

Examples of the functional group-carrying modifying agent (hereinafter simply referred to as "modifier") used in the present invention are cyclic ether structure-carrying compounds such as ethylene oxide, propylene oxide, glycidyl methaorylate, tetraglycidyl-m-xylenediamine, tetraglycidyl-1,3-bisaminomethylcyclohexane, tetraglycidyldiaminodiphenylmethane, tetraglycidyl-p-phenylenediamine, diglycidylaniline and diglycidyl-o-toluidine; ketone compounds such as 4-dimethylaminobenzophenone, 4-diethylaminobenzophenone, 4-morpholinobenzophenone and 4-morpholinoacetophenone; acrylamide compounds such as dimethylacrylamide, diethylacrylamide and dimethylaminopropylacylamide; cyclic amine compounds; and linear amine compounds. Of these, cyclic amine compounds and linear amine compounds are particularly preferable, from a viewpoint such that (1) solubility thereof to a solvent is superior, and (2) fuel cost saving can be remarkably improved.

Examples of the above-mentioned cyclic amine compounds are 1,3-dimethyl-2-imidazolidinone,
1,3-diethyl-2-imidazolidinone,
1,3-dipropyl-2-imidazolidinone,
1-methyl-3-ethyl-2-imidazolidinone,
1-methyl-3-propyl-2-imidazolidinone,
1-methyl-3-butyl-2-imidazolidinone,
1-methyl-3-(2-ethoxyethyl)-2-imidazolidinone and
1,3-dimethyl-3,4,5,6-tetrahydropyrimidinone.

Specific examples of the above-mentioned linear amine compounds are 1,1-dimethoxytrimethylamine, 1,1-diethoxytrimethylamine, 1,1-di-n-propoxytrimethylamine, 1,1-di-iso-propoxytrimethylamine, 1,1-di-n-butoxytrimethylamine and 1,1-di-tert-butoxytrimethylamine.

Among the above-mentioned cyclic amine compounds and linear amine compounds, a low molecular weight amine such as 1,1-dimethoxytrimethylamine or 1,3-dimethyl-2-imidazolidinone is preferable from a viewpoint that fuel cost saving can be remarkably improved by using a small amount thereof.

A hydrocarbon solvent used in Process-1 or Process-2 in accordance with the present invention comprises those solvents, which do not deactivate the organic alkali metal compound. Preferable examples thereof are aliphatic hydrocarbons, aromatic hydrocarbons and alicyclic hydrocarbons. Particularly preferable examples thereof are those having 2 to 12 carbon atoms. Specific examples thereof are propane, n-butane, iso-butane, n-pentane, iso-pentane, n-hexane, cyclohexane, propene, 1-butene, iso-butene, trans-2-butene, cis-2-butene, 1-pentene, 2-pentene, 1-hexene, 2-hexene, benzene, toluene, xylene and ethylbenzene, and a combination of at least two thereof.

An amount used of the modifier is usually from 0.1 to 10 mol, and preferably from 0.5 to 2 mol, per 1 mol of the active polymer. When the amount is less than 0.1 mol, an improving effect of fuel cost saving may be small. When the amount exceeds 10 mol, the unreacted modifier remains in the solvent. It is not recommendable from an economical point of view, because an additional step of separating the modifier from the solvent is required in order to recycle and reuse the solvent.

The reaction of the step (3) in Process-1 and the reactions of the steps (3) and (4) in Process-2 proceed rapidly. As a preferable contacting method, there are exemplified (1) regarding Process-1, a method comprising the step of adding the modifier to the reaction mixture obtained in the step (2), and (2) regarding Process-2, a method comprising the steps of (i) adding the compound represented by the formula (1) to the reaction mixture obtained in the step (2), and (ii) adding the modifier to the obtained reaction mixture. A reaction temperature is generally from ambient temperature to 80° C., and a reaction time is generally from several seconds to several hours.

From a viewpoint of kneading processability of the modified polymer rubber obtained, it is permitted to add a coupling agent represented by the following formula to the active polymer, (1) prior to or after the step (3) regarding Process-1, and (2) prior to or after the step (3) or prior to or after the step (4) regarding Process-2,

wherein R is an alkyl, alkenyl, cycloalkenyl or aromatic hydrocarbon group; M is a silicon or tin atom; X is a halogen atom; and a is an integer of from 0 to 2.

An amount added of the above-mentioned coupling agent is usually from 0.03 to 0.4 mol, and preferably from 0.05 to 0.3 mol, per 1 mol of the active polymer. When the amount is less than 0.03 mol, an improving effect of processability of the modified polymer rubber may be small. When the amount exceeds 0.4 mol, a proportion of the active polymer participating in the reaction with the modifier decrease, so that an improving effect of fuel cost saving may decrease.

The modified polymer rubber contained in the reaction mixture obtained in the step (3) of Process-1 or in the step (4) of Process-2 can be solidified according to a solidifying method, which is usually carried out in the production of rubber by solution polymerization, such as (1) a method comprising the step of adding a coagulant and (2) a method comprising the step of adding steam. A solidifying temperature is not particularly limited.

The solidified modified polymer rubber separated can be dried with a drier such as a band drier and an extrusion type drier, which are commonly employed in a synthetic rubber production. A drying temperature is not limited.

Mooney viscosity ($ML_{1+4}$) of the obtained modified polymer rubber is preferably from 10 to 200, and more preferably from 20 to 150. When the Mooney viscosity is less than 10, mechanical properties such as tensile strength of vulcanized rubber thereof may decrease. When the Mooney viscosity exceeds 200, miscibility when blending said modified polymer rubber with the other rubber to produce a rubber composition may be so poor that it is difficult to produce said rubber composition, and as a result, mechanical properties of a vulcanized rubber composition thereof may decrease.

A content of the vinyl bond (which bond is derived from the conjugated diene monomer) contained in the obtained modified polymer rubber is preferably from 10 to 70%, and more preferably from 15 to 60%. When the content is less than 10%, a glass transition temperature of the modified polymer rubber obtained may be lowered to deteriorate a grip performance of motorcar tires composed of the modified polymer rubber. When the content exceeds 70%, a glass transition temperature of the modified polymer rubber obtained may be elevated to deteriorate the impact resilience of the modified polymer rubber.

The obtained modified polymer rubber can be used in combination with other components such as other rubbers and various additives.

Examples of the other rubber are styrene-butadiene copolymer rubber obtained by emulsion polymerization; polybutadiene rubber, butadiene-isoprene copolymer rubber and styrene-butadiene copolymer rubber obtained by solution polymerization using catalysts such as an anion polymerization catalyst and a ziegler type catalyst; natural rubber; and a combination of at least two thereof.

As to the rubber composition comprising the other rubber and the modified polymer rubber, a proportion of the latter rubber is preferably not less than 10% by weight, and more preferably not less than 20% by weight, based on 100% by weight of a total weight of both rubbers. When the proportion is less than 10% by weight, the impact resilience of the rubber composition obtained may hardly be improved, and also processability thereof is not good.

A kind and an amount of the above-mentioned additives can by determined depending upon purposes of using the rubber composition obtained. Examples of the additives usually employed in a rubber industry are vulcanizing agents such as sulfur; stearic acid; zinc white; thiazol type vulcanization accelerators; vulcanization accelerators such as thiuram type vulcaniztion accelerators and sulfenamide type vulcanization accelerators; organic peroxides; reinforcing agents such as carbon black of HAF and ISAF grades; fillers such as silica, calcium carbonate and talc; extender oils; processing coagents; and antioxidants.

A process for producing the above-mentioned rubber composition is not limited. An example thereof is a process comprising the step of mixing respective components with use of a known mixer such as a roll and a Bambury mixer. The resulting rubber composition is usually vulcanized, and is used as a vulcanized rubber composition.

Since the modified polymer rubber obtained by the process in accordance with the present invention is superior in impact resilience and processability, a rubber composition comprising said rubber is most suitable for motorcar tires having superior fuel cost saving. Said rubber composition can be also employed fuel uses such as the sole of a shoe, floor materials and rubber vibration insulators.

EXAMPLES

The present invention is explained with reference to the following Examples, which are not intended to limit the scope ok the present invention.

Reference Example 1

A solution prepared by dissolving 25 g of 4-N,N-dimethylamlinobenzophenone in 100 ml of tetrahydrofuran was gradually added to 80 ml of a tetrahydrofuran solution obtained by the reaction between methyltriphenylphosphonium bromide and t-butoxypotassium. After completion of addition, the reaction was carried out at 0° C. for 4 hours, and the obtained reaction mixture was purified to obtain a compound represented by the above formula (1), 1-(4-N,N-dimethylaminophenyl)-1-phenylethylene.

Reference Example 2

Reference Example 1 was repeated except that 25 g of 4-N,N-dimethylaminobenzophenone was changed to 25 g of 4-morpholinobenzophenone, thereby obtaining 1-(4-morpholinophenyl)-1-phenylethylene, which is a compound represented by the above formula (1).

Example 1

A 20 liter-inner volume stainless steel polymerization reactor was washed and dried, and thereafter purged with dry nitrogen. Successively, 1420 g of 1,3-butadiene, 580 g of styrene, 122 g of tetrahydrofuran, 10.2 kg of hexane and a cyclohexane solution containing 11.2 mmol of a chemical species (hereinafter referred to as "chemical species (C1)") obtained by reacting n-butyllithium with 1-(4-N,N-dimethylaminophenyl)-1-phenylethylene obtained in Reference Example 1 were introduced therein, and polymerization was carried out at 65° C. for 3 hours under stirring.

To the obtained polymerization reaction mixture, 11.2 mmol of 1,1-dimethoxytrimethylamine (a modifier) was added, and reaction was continued for 30 minutes at 65° C. under stirring. To the obtained reaction mixture, 10 ml of methanol was added, and stirring was further continued at 65° C. for 5 minutes. The obtained reaction mixture was taken out and mixed with 10 g of 2,6-di-t-butyl-p-cresol, a trade name of SUMILIZER BHT, manufactured by Sumitomo Chemical Co., Ltd. Thereafter, most of hexane was evaporated, and successively the remainder was dried under reduced pressure at 55° C. for 12 hours, thereby obtaining a modified polymer rubber. Physical properties of the modified polymer rubber were measured according to the following methods. The result is shown in Table 1.

1. Mooney viscosity was measured at 100° C. according to JIS K-6300.
2. Content of vinyl group was measured according to infrared spectroscopic analysis.
3. Content of styrene unit was measured according to refractive index method.

The polymer rubber and components as shown in Table 2 were kneaded with one another using a plastomil for laboratory use, and the kneaded product was molded using a 6-inch roll, thereby obtaining a sheet. The sheet was heated at 160° C. for 45 minutes to be cured, and thereafter a 60° C. impact resilience of the cured sheet was measured using Luepke resilience tester. The result is shown in Table 1.

Example 2

Example 1 was repeated except that (i) the cyclohexane solution containing 11.2 mmol of a chemical species (C1) was changed to a cyclohexane solution containing 10.4 mmol of a chemical species (C1), and (ii) 11.2 mmol of 1,1-dimethoxytrimethylamine (a modifier) was changed to 10.4 mmol of 1,3-dimethyl-2-imidazolidinone (a modifier), thereby obtaining a modified polymer rubber. Physical properties of the modified polymer rubber are shown in Table 1.

Example 1 was repeated, except that said modified polymer rubber was used, to obtain a 60° C. impact resilience of the cured skeet. The result is shown in Table 1.

Example 3

Example 1 was repeated, except that (i) the cyclohexane solution containing 11.2 mmol of chemical species (C1) was changed to a cyclohexane solution containing 10.1 mmol of a chemical species (hereinafter referred to as "chemical species (C2))" obtained by reacting n-butyllithium with 1-(4-morpholinophenyl)-1-phenylethylene was used, and (ii) an amount of 1,1-dimethoxytrimethylamine (a modifier) was changed to 10.1 mmol, thereby obtaining a modified polymer rubber. Physical properties of the modified polymer rubber are shown in Table 1.

Example 1 was repeated, except that said modified polymer rubber was used, to obtain a 60° C. impact resilience of the cured sleet. The result is shown in Table 1.

Example 4

Example 1 was repeated, except that (i) the cyclohexane solution containing 11.2 mmol of chemical species (C1) was changed to a cyclohexane solution containing 10.1 mmol of chemical species (C2), and (ii) 11.2 mmol of 1,1-dimethoxytrimethylamine (a modifier) was changed to 10.1 mmol of 1,3-dimethyl-2-imidazolidinone (a modifier), thereby obtaining a modified polymer rubber. Physical properties of the modified polymer rubber are shown in Table 1.

Example 1 was repeated, except that said modified polymer rubber was used, to obtain a 60° C. impact resilience of the cured sheet. The result is shown in Table 1.

Comparative Example 1

Example 1 was repeated, except that (i) n-butyllithium was used in place of the chemical species (C1), and (ii) any modifier was not used, thereby obtaining an unmodified polymer rubber. Physical properties of the unmodified polymer rubber are shown in Table 1.

Example 1 was repeated, except that said unmodified polymer rubber was used, to obtain a 60° C. impact resilience of the cured sheet. The result is shown in Table 1.

Example 5

Example 1 was repeated to obtain a modified polymer rubber, except that (i) the cyclohexane solution containing 11.2 mmol of chemical species (C1) was changed to a cyclohexane solution containing 11.0 mmol of the chemical species (C1), and (ii) an amount of the modifier was changed to 11.0 mmol. Physical properties of the obtained modified polymer rubber are shown in Table 4.

The polymer rubber and components as shown in Table 3 were kneaded with one another using a plastomil for laboratory use, and the kneaded product was molded using a 6-inch roll, thereby obtaining a sheet. The sheet was heated at 160° C. for 15 minutes to be cured, and thereafter a 60° C. impact resilience of the cured sheet was measured using Luepke resilience tester. The result is shown in Table 4.

Comparative Example 2

Example 5 was repeated, except that (i) n-butyllithium was used in place of the chemical species (C1), and (ii) any modifier was not used, thereby obtaining an unmodified polymer rubber. Physical properties of the unmodified polymer rubber are shown in Table 4.

Example 5 was repeated, except that said unmodified polymer rubber was used, to obtain a 60° C. impact resilience of the cured sheet. The result is shown in Table 4.

Example 6

A 20 liter-inner volume stainless steel polymerization reactor was washed and dried, and thereafter purged with dry nitrogen. Successively, 1420 g of 1,3-butadiene, 580 g of styrene, 122 g of tetrahydrofuran, 10.2 kg of hexane and 10.4 mmol of a chemical species (C1) obtained by reacting n-butyllithium with 1-(4-N,N-dimethylaminophenyl)-1-phenylethylene obtained in Reference Example 1 in cyclohexane were introduced therein, and polymerization was carried out at 65° C. for 3 hours under stirring.

To the obtained polymerization reaction mixture, 10.4 mmol of 1-(4-N,N-dimethylaminophenyl)-1-phenylethylene was added, and reaction was continued for 60 minutes under stirring.

To the obtained polymerization reaction mixture, 10.4 mmol of 1,3-dimethyl-2-imidazolidinone (a modifier) was added, and reaction was further continued for 30 minutes at 65° C. under starring. To the obtained reaction mixture, 10 ml of methanol was added, and stirring was further continued at 65° C. for 5 minutes.

The obtained reaction mixture was taken out and mixed with 10 g of 2,6-di-t-butyl-p-cresol, a trade name of SUMILIZER BHT, manufactured by Sumitomo Chemical Co., Ltd. Thereafter, most of hexane was evaporated, and successively, the remainder was dried under reduced pressure at 55° C. for 12 hours, thereby obtaining a modified polymer rubber. Physical properties of the modified polymer rubber were measured. The result is shown in Table 4.

Using the polymer rubber and components as shown in Table 3, impact resilience was measured in a manner similar to that of Example 1. The result is shown in Table 4.

Example 7

Example 6 was repeated except that 1,3-dimethyl-2-imidazolidinone (a modifier) was changed to 1,1-dimethoxytrimethylamine (a modifier), thereby obtaining a modified polymer rubber. Physical properties of the modified polymer rubber are shown in Table 4.

Using the polymer rubber and components as shown in Table 3, impact resilience was measured in a manner similar to that of Example 1. The result is shown in Table 4.

Comparative Example 3

Polymerization was carried out in a similar manner to that of Example 6, except that a n-hexane solution containing 11.0 mmol of n-butyllithium in place of the chemical species (C1) was used. To the obtained reaction mixture, 10 ml of methanol was added, and stirring was further continued at 65° C. for 5 minutes.

The obtained reaction mixture was taken out and mixed with 10 g of 2,6-di-t-butyl-p-cresol, a trade name of SUMILIZER BHT, manufactured by Sumitomo Chemical Co., Ltd. Thereafter, most of hexane was evaporated, and successively, the remainder was dried under reduced pressure at 55° C. for 12 hours, thereby obtaining a modified polymer rubber. Physical properties of the modified polymer rubber were measured. The results are shown in Table 4.

Using the polymer rubber and components as shown in Table 3, impact resilience was measured in a manner similar to that of Example 6. The result is shown in Table 4.

Example 8

Using the polymer rubber obtained in Example 6 and components as shown in Table 2, impact resilience was measured in a manner similar to that of Example 1. The result is shown in Table 1.

Comparative Example 4

Using the polymer rubber obtained in Comparative Example 3, and components as shown in Table 2, impact resilience was measured in a manner similar to that of Example 1. The result is shown in Table 1.

TABLE 1

|  | Examples | | | | | Comparative Examples | |
|---|---|---|---|---|---|---|---|
|  | 1 | 2 | 3 | 4 | 8 | 1 | 4 |
| Chemical species (Note 1) | C1 | C1 | C2 | C2 | C1 | — | — |
| Modifier (Note 2) | M1 | M2 | M1 | M2 | C1 + M2 | — | — |
| Styrene unit content (wt %) | 29 | 28 | 29 | 27 | 29 | 29 | 29 |
| Vinyl content (wt %) | 42 | 42 | 42 | 42 | 42 | 42 | 42 |
| Mooney viscosity ($ML_{1+4}$ 100° C.) | 42 | 51 | 65 | 87 | 38 | 68 | 44 |
| Impact resilience (60° C.)(%) | 58 | 58 | 56 | 57 | 59 | 53 | 50 |

(Note 1)
C1: 1-(4-N,N-dimethylaminophenyl)-1-phenylethylene + n-BuLi → C1
C2: 1-(4-morpholinophenyl)-1-phenylethylene + n-BuLi → C2
(Note 2)
M1: 1,1-dimethoxytrimethylamine
M2: 1,3-dimethyl-2-imidazolidinone

TABLE 2

| Components | Proportion(part by weight) |
|---|---|
| Polymer rubber | 100 |
| Silica(Note 1) | 78.4 |
| Silane coupling agent(Note 2) | 6.4 |
| Carbon | 6.4 |
| Extender oil(Note 3) | 47.6 |
| Antioxidant(Note 4) | 1.5 |
| Zinc white | 2 |
| Vulcanization accelerator(Note 5) | 1 |
| Vulcanization accelerator(Note 6) | 1 |
| Wax(Note 7) | 1.5 |
| Sulfur | 1.4 |

(Note 1)Trademark of ULTRASIL VN3-G, manufactured by Degussa.
(Note 2)Si69 manufactured by Deggusa.
(Note 3)Aroma oil, trademark of X-140, manufactured by Kyodo Oil Co., Ltd.
(Note 4)Antioxidant, trademark of ANTIGEN 3C, manufactured by Sumitomo Chemical Co., Ltd.
(Note 5)Vulcanization accelerator, trademark of SOXINOL CZ, manufactured by Sumitomo Chemical Co., Ltd.
(Note 6)Vulcanization accelerator, trademark of SOXINOL D, manufactured by Sumitomo Chemical Co., Ltd.
(Note 7)Trademark of SUNNOC N, manufactured by Ouchishinko Chemical Industrial Co., Ltd.

TABLE 3

| Components | Proportion (part by weight) |
|---|---|
| Polymer rubber | 100 |
| HAF Carbon black(Note 1) | 45 |
| Antioxidant(Note 2) | 1.5 |
| Zinc white | 3 |
| Stearic acid | 2 |
| Vulcanization accelerator(Note 3) | 1 |
| Wax(Note 4) | 1.5 |
| Sulfur | 1.75 |

(Note 1)Trademark of DIABLACK N 339, manufactured by Mitsubishi Chemical Corporation.
(Note 2)Trademark of ANTIGEN 3C, manufactured by Sumitomo Chemical Co., Ltd.
(Note 3)Trademark of SOXINOL CZ, manufactured by Sumitomo Chemical Co., Ltd.
(Note 4)Trademark of SUNNOC N, manufactured by Ouchishinko Chemical Industrial Co., Ltd.

TABLE 4

|  | Examples | | | Comparative Examples | |
|---|---|---|---|---|---|
|  | 5 | 6 | 7 | 2 | 3 |
| Chemical species (Note 1) | C1 | C1 | C1 | — | — |
| Modifier (Note 2) | M1 | C1 + M2 | C1 + M1 | — | — |
| Styrene unit content (wt %) | 29 | 29 | 29 | 29 | 29 |

TABLE 4-continued

|  | Examples | | | Comparative Examples | |
|---|---|---|---|---|---|
|  | 5 | 6 | 7 | 2 | 3 |
| Vinyl content (wt %) | 43 | 42 | 42 | 42 | 42 |
| Mooney viscosity ($ML_{1+4}100°$ C.) | 59 | 38 | 45 | 52 | 44 |
| Impact resilience($60°$ C.)(%) | 68 | 68 | 68 | 60 | 59 |

(Note 1)
C1: 1-(4-N,N-dimethylaminophenyl)-1phenylethylene + n-BuLi → C1
(Note 2)
M1: 1,1-dimethoxytrimethylamine
M2: 1,3-dimethyl-2-imidazolidinone

What is claimed is:

1. A process for producing a modified polymer rubber having modified both terminals, which comprises the steps of:
   (1) reacting a compound represented by the following formula (1) with an organic alkali metal compound to produce a chemical species,

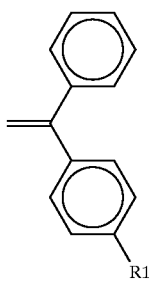

(1)

wherein $R_1$ is an amino, alkoxy, silyloxy, acetal, carboxyl or mercapto group or a group derived from any of these groups,
   (2) polymerizing a conjugated diene monomer or a combination of a conjugated diene monomer with an aromatic vinyl monomer in the presence of the chemical species to produce an active polymer having an alkali metal at an end thereof, and
   (3) reacting the active polymer with a functional group-carrying modifying agent in a hydrocarbon solvent to produce the modified polymer rubber having modified both ends.

2. The process for producing a modified polymer rubber having modified both ends according to claim 1, wherein $R_1$ in the formula (1) is an N,N-dimethylamino group, an N,N-diethylamino group, an N,N-dipropylamino group, an N,N-dibutylamino group or a morpholino group.

3. The process for producing a modified polymer rubber having modified both ends according to claim 1, wherein the functional group-carrying modifying agent is a cyclic or linear amine compound.

4. The process for producing a modified polymer rubber having modified both ends according to claim 1, wherein the functional group-carrying modifying agent is 1,1-dimethoxytrimethylamine or 1,3-dimethyl-2-imidazolidinone.

5. A process for producing a modified polymer rubber having modified both ends, which comprises the steps of:
   (1) reacting a compound represented by the following formula (1) with an organic alkali metal compound to produce a chemical species,

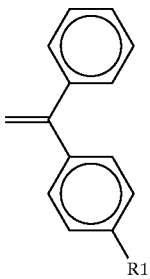

(1)

wherein $R_1$ is an amino, alkoxy, silyloxy, acetal, carboxyl or mercapto group or a group derived from any of these groups,
   (2) polymerizing a conjugated diene monomer or a combination of a conjugated diene monomer with an aromatic vinyl monomer in the presence of the chemical species to produce an active polymer having an alkali metal at an end thereof,
   (3) reacting the active polymer with a compound represented by the above formula (1) to produce an active polymer, each of whose both ends is modified and has an alkali metal, and
   (4) reacting the active polymer with a functional group-carrying modifying agent in a hydrocarbon solvent to produce the modified polymer rubber having modified both ends.

6. The process for producing a modified polymer rubber having modified both ends according to claim 5, wherein $R_1$ in the formula (1) is an N,N-dimethylamino group, an N,N-diethylamino group, an N,N-dipropylamino group, an N,N-dibutylamino group or a morpholino group.

7. The process for producing a modified polymer rubber having modified both ends according to claim 5, wherein the functional group-carrying modifying agent is a cyclic or linear amine compound.

8. The process for producing a modified polymer rubber having modified both ends according to claim 5, wherein the functional group-carrying modifying agent is 1,1-dimethoxytrimathylamine or 1,3-dimethyl-2-imidazolidinone.

* * * * *